United States Patent
Kimoto et al.

[15] 3,694,535
[45] Sept. 26, 1972

[54] PROCESS AND APPARATUS FOR REMOVING VOLATILE SUBSTANCES FROM VISCOUS COMPOSITIONS

[72] Inventors: Koji Kimoto, Kamakura, Kanagawa-Pref.; Yoshinari Yamagisawa, Yokohama, Kanagawa-Pref.; both of Japan

[73] Assignee: Toyo Koatsu Industries, Incorporated, Tokyo, Japan

[22] Filed: Oct. 15, 1970

[21] Appl. No.: 90,233

Related U.S. Application Data

[63] Continuation of Ser. No. 765,890, Oct. 8, 1968, abandoned.

[52] U.S. Cl. ......... 264/102, 159/47 R, 264/DIG. 13, 425/72
[51] Int. Cl. ..................... B01d 1/22, B29c 25/00
[58] Field of Search .................... 264/101; 425/72

[56] References Cited

UNITED STATES PATENTS

| | | |
|---|---|---|
| 2,849,430 | 8/1958 | Amos et al. ............ 159/2 E UX |
| 3,351,119 | 11/1967 | Rosenblad ................ 159/13 B |
| 3,395,746 | 8/1968 | Szabo et al. .......... 264/102 UX |
| 3,410,938 | 11/1968 | Schippers .................. 264/102 |

Primary Examiner—Robert F. White
Assistant Examiner—J. H. Silbaugh
Attorney—Christen and Sabol

[57] ABSTRACT

A process for removing volatile substances from viscous compositions, for example, removing volatile solvent and unreacted monomer from polystyrene. The composition is heated to a temperature above the boiling points of the volatile substances at the pressure employed in the operation. The composition is then formed into strands and the strands are impacted against a solid surface. The composition is then caused to flow as a film over a heated surface while the strands and film are exposed to sub-atmospheric pressure.

7 Claims, 3 Drawing Figures

PROCESS AND APPARATUS FOR REMOVING VOLATILE SUBSTANCES FROM VISCOUS COMPOSITIONS

This application is a continuation of Ser. No. 765,890 filed Oct. 8, 1968 and now abandoned.

BACKGROUND OF THE INVENTION

1. Field of the Invention

This invention relates to a process for removing volatile substances, such as unreacted monomers and/or solvents, from viscous compositions such as polymers of styrene and/or its homologs.

2. Description of the Prior Art

Usually, polymer compositions produced by bulk polymerization or solution polymerization necessarily contain volatile substances such as unreacted monomer or solvent, in varying amounts depending on the particular conditions of the polymerization process. In using such polymer compositions for injection molding or extrusion molding, it is necessary to remove the volatiles to very low residual amounts.

Especially when styrene polymer compositions are produced by the above processes, the residuals should be kept usually below about 0.5 wt. percent to obtain sound moldings devoid of molding defects and having excellent practical physical properties, such as, heat-distortion temperature, weatherproofness, etc.

Generally, many methods have been proposed heretofore for removing volatile substances from such polymer compositions in viscous liquid form, for example, 1. There is the type in which the polymer structure is divided into fine streams or stands under vacuum to expose a large surface area to the mass, and
2. The type in which the liquid polymer composition under vacuum flows down as a film along the wall of a vessel.

However, in type (1), due to the latent heat of evaporation of the volatile substances, the surface of the liquid polymer composition cools rapidly and the viscosity of the surface of the strand increases quickly as the evaporation progresses. Thus, the evaporation can reach a certain limit beyond which it cannot proceed.

In type (2), especially when such large amounts as 40 to 60 wt. percent of volatiles are present in the liquid polymer composition, foaming occurs because of the evaporation of the volatiles and the film becomes bulky giving no effective flow-down of the film.

When small amounts such as 1 to 5 wt. percent of volatiles are contained or at the stage where the amount is reduced by reduced to such an extent, the liquid becomes so highly viscous that it becomes very difficult to obtain an effective flow-down on the wall or the polymer composition peels down off the wall.

Accordingly, the above two methods are not practical and are insufficient to remove volatile substances fully set styrene polymer compositions containing them to the extent that the residual volatiles may be less than 0.5 wt. percent as required to obtain sound moldings. Usually, therefore, a complicated operation of two steps is employed by using vented extruders or similar devices in connection with the above-mentioned methods.

SUMMARY OF THE INVENTION

The present invention provides a process for removing volatile substances from styrene polymer compositions produced by bulk polymerization or solution polymerization, wherein the residual volatile substances can be reduced in one operation to a maximum of about 0.5 wt. percent without the disadvantages of the prior processes as mentioned above.

The process of the present invention comprises (1) heating the composition to a temperature above the boiling points of the volatile substances contained in it but below the temperature at which the polymer composition is thermally denaturalized, pressurizing and discharging the composition in strand form through an orifice into a vacuum system maintained below an absolute pressure of 100 mm.Hg thereby evaporating and separating some of the volatile substances, (2) in the same vessel, subjecting the strand to impact by collision with a heated surface positioned below the orifice after discharge from the orifice, and (3) causing the composition after impact to flow down gravitationally along the heated surface while transferring heat through the heated surface to the composition thus compensating for a portion of the latent heat of evaporation consumed in the evaporation of the volatile substances and whereby, at the same time, the surface of the composition exposed to the vacuum is renewed while flowing down so as to accelerate the vaporization of the volatile substances.

DESCRIPTION OF THE PREFERRED EMBODIMENT

Figure 1:
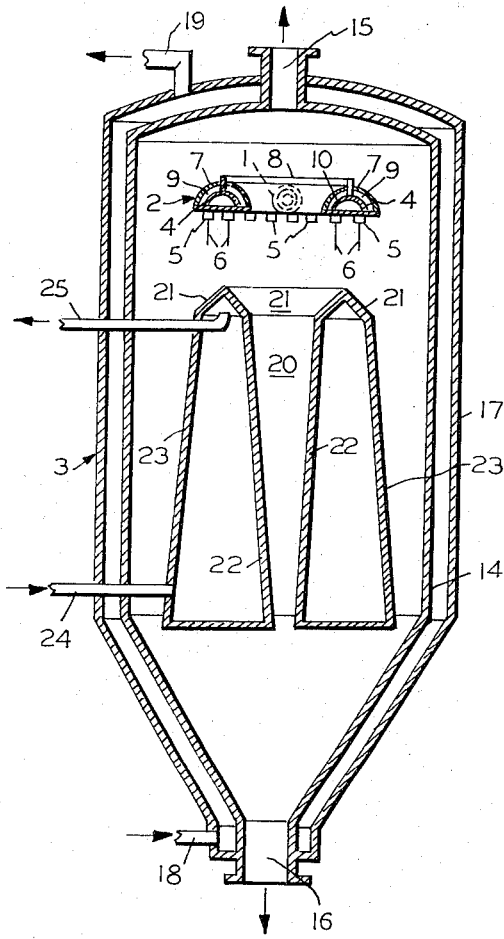
FIG. 1 is a vertical section through devolatilizing apparatus illustrating one embodiment of the invention.
Figure 2:
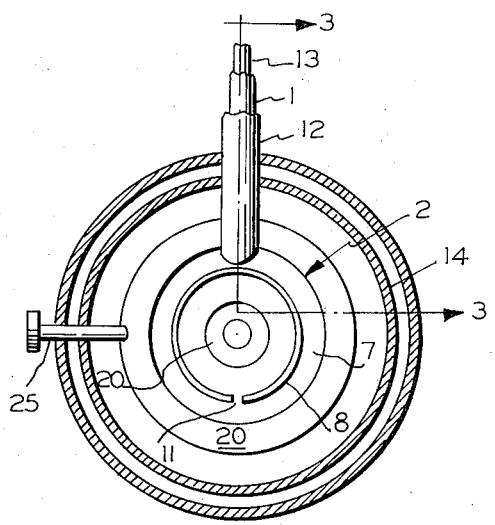
FIG. 2 is a horizontal cross-section through the devolatilizing apparatus, taken along line 2—2 of FIG. 1.
Figure 3:
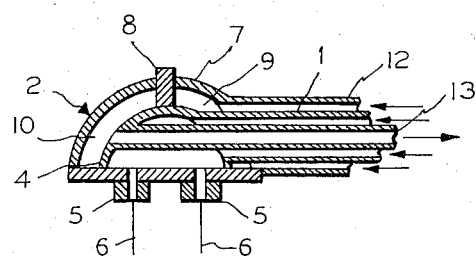
FIG. 3 is an enlarged vertical section through the strand former of the apparatus shown in FIG. 1 taken on line 3—3 of FIG. 1.

One embodiment of an apparatus the present invention is shown in FIGS. 1, 2, and 3 of the attached drawings. In this embodiment, polymer feed pipe 1 is connected to the interior of toroid-shaped strand former 2 positioned in the upper portion of jacketed vacuum tank 3. The strand former 2 is provided with a polymer distributor head 4 having a plurality of downwardly directed fine orifices 5 through which the polymer is forced to form strands 6. The strand former 2 is also provided with a heating jacket 7 on its upper parts. The jacket 7 is divided by rib 8 into an outer conduit 9 and an inner conduit 10. The rib 8 does not extend all the way around and, thus, the conduits 9 and 10 are interconnected through gap 11. The outer conduit 9 is connected to pipe 12 through which heating fluid is fed and conduit 10 is connected to pipe 13 through which the heating fluid exits.

The vacuum tank 3 comprises a shell 14 having an opening 15 for reducing the pressure within the tank and for withdrawing volatile substances and an outlet 16 at the bottom for taking out the devolatilized polymer composition. The tank 3 is also provided with a heating jacket 17 having an inlet 18 and an outlet 19 for circulation of heating fluid.

Internally mounted within the shell 14 is an elongated toroid-shaped heater 20. The upper surface of heater 20 is formed with peaked roof 21. The inner walls 22 of heater 20 are tapered downwardly towards each other and the outer walls 23 are tapered downwardly away from each other such that the heater is wider both in cross-section and in overall width at the bottom and narrower at the top. The heater 20 is so arranged within shell 14 that the strands 6 fall upon the peaked roof 21 as best shown in FIG. 1. If desired, the walls 22 and/or 23 may be vertical or nearly so, the important factor being that the polymer composition is caused to flow downwardly in the form of a film. The heater 21 is hollow and is provided with heating fluid inlet 24 and outlet 25 for circulation of heating fluid within it.

In operation, the polymer composition to be treated, comprising a styrene polymer produced by bulk polymerization or solution polymerization and volatile substances such as solvent and unreacted monomer, is heated to a temperature above the melting point of the polymer and above the boiling points of the volatile substances at the pressure within shell 14 but below the temperature at which the polymer composition begins to thermally decompose. The heated composition is fed through pipe 1 into distributor head 4 where it flows under pressure to the fine orifices 5. The composition then is injected into the vacuum tank 3 through the fine orifices 5 to form strands.

The efficiency of evaporation of the volatile substances with respect to effective inner space of the shell 14 may be made higher if the formed strands do not contact each other or with the inner wall of shell 14.

The size and shape of the fine orifices 5 are suitably chosen according to the vapor pressure of the volatile substances in the heated polymer composition and the viscosity of the heated polymer composition so that continuous strands are readily formed even though foaming takes place in passing through the orifices. The pressure usually employed in the feed pipe 1 and distributor head 4 is in the range of about 2 to about 20 kg/cm$^2$, for example, when the orifices 5 are circular and have a diameter of about 3 mm.

Thus, by dividing the liquid into strands in a foaming state, the volatiles not only in the surface part of the strand itself but also in its inner part are effectively evaporated and separated from the polymer being treated. However, since the latent heat of evaporation of the volatile substances is supplied by the strands 6 as they travel downwardly, their own temperature drops, and the viscosity of their surfaces rises.

Consequently, the diffusion velocity of the volatile substances in the strands 6 drops quickly. Even if the dropping distance of the strands 6 is increased, no substantial evaporation continues and the desired objects cannot be attained.

We have found that effective evaporation of the volatile substances is accelerated first by the collision of the strands 6 with a solid surface in the same tank, that is, with the peaked roof 21 of the heater 20.

The high viscosity surface layer of the strand is broken by the impact accompanying this collision, and the concentration gradient of the volatile substances present, respectively, in the surface and inner parts of the strands is corrected.

Secondly, the evaporation is also markedly accelerated by gravitationally flowing the polymer composition after impact, downwardly on the walls 22 and 23 of the heater 20. In this case, the liquid receives a supply of a heat quantity from the heater 20 to compensate the latent heat consumed in the evaporation of the volatile substances and flows down in the form of a film exposing a large surface area to the vacuum. As a result, vapor pressure of the residual volatile substances increases and the viscosity of the composition decreases. While flowing down, parts of the surface of the film exposed to the vacuum are continually replaced with parts in contact with the walls of the heater 20. Thus, the concentration gradient between the surface and the inside of the film is continuously corrected and the evaporation is accelerated.

After the above treatment, residual volatile substances in the polymer composition are less than about 0.5 wt. percent and the composition is accumulated in the bottom part of the shell 14 of vacuum tank 3 and gradually taken out through the outlet 16.

The volatile substances evaporated and separated from the treated liquid in shell 14 can be easily taken out through the opening 15 by means of any suitable vacuum system, recovered and recycled to the polymerization section.

The main point of the present invention is that in removing volatiles from the highly viscous liquid mixture (in this embodiment, the polymer composition) three important factors, i.e., ejection of liquid mixture in the form of strands into the vacuum tank 3 and collision of the strands with the roof 21 of the heater 20 in the same vessel successively and flowing the mixture gravitationally downwardly along the walls 22 and 23 of the heater 20 in the vacuum tank, are combined and worked in this order consecutively in the same vacuum tank 3.

The influence of the degree of vacuum on the amount of residual volatile substances is large. The degree of vacuum required depends usually on the kind of components of the liquid to be treated and the ranges of temperature applied. The lower pressure gives the better evaporation, but the lower limit is practically determined by the condensation temperature of volatiles to be recovered in recovery condensers connected with opening 15. For the above polymer composition, the pressure in the tank 3 usually used is about 50 to about 100 mm.Hg., absolute.

The temperature of the liquid to be treated is preferably above the boiling points of the volatile substances for practical use, but below a temperature at which the influence of thermal decomposition begins to appear. When treating the above polymer composition, the range from about 150°C. to about 300°C. is suitable.

The temperature of the heater 20 also is suitably maintained above the boiling points of the volatiles but below the temperature of decomposition of the viscous liquid; for example, temperatures of about 150°C. to 250°C. are suitable.

Practically speaking, the diameter of orifices 5 is preferably below 4 mm. for forming strands such as are described above. But, if the orifice diameter is less than 1 mm., the orifice tends to become clogged by foreign substances, such as, pieces of gasket, dust, etc., and therefore is not recommendable for industrial use.

The process for removing volatile substances according to the present invention can be applied to many other compositions and can be readily applied particularly to thermoplastic polymer compositions containing styrene, or substituted styrene as a component, such as polystyrenes for general purposes, impact resistant polystyrenes, acrylonitrile-styrene copolymerized resins, acrylonitrile-butadiene-styrene copolymerized resins and modified acrylonitrile-butadiene-styrene type resins.

Furthermore, in working the present invention, the form of the feeding pipe, distributor head and orifices, the manner of arrangement of the orifices, the form and arrangement of the heater and other structural factors may be varied and modified in many ways other than are shown in the attached drawings.

The following examples are presented.

EXAMPLE 1

A reaction solution obtained by the bulk polymerization of styrene and containing 10 wt. percent ethyl benzene, 8 wt. percent styrene and 82 wt. percent polystyrene was heated to about 250°C. to about 260°C., and was injected continuously in the form of strands through four orifices each having a diameter of 3 mm. using a pressure of 4 to 13 kg/cm$^2$ into a vacuum tank 3 maintained under a vacuum of 30 to 60 mm.Hg, absolute. The strands were made, consecutively in the same tank, to collide with the roof of a heater which had a conical roof having an apex angle of 45° and downwardly expanded side walls which were each inclined by 3° with respect to the axis of the heater. The heater was maintained at 260°C. to 270°C. and was set about 200 mm. below the orifices. After impact, the composition in the form of a film was made to flow down the side walls for 400 to 800 mm. gravitationally. The temperature of the polystyrene accumulated in the bottom part of the vacuum tank 3 was about 230°C. to 240°C. which was about 10°C. to 15°C. higher than the value calculated from the latent heat of evaporation of the volatilized volatile substances. The polymer composition was taken out and was analyzed by gas-chromatography. The result of analysis showed that the residual volatile substances content in the polymer composition treated under these conditions was 0.1 to 0.3 wt. percent. In comparison, when the liquid was treated under the same conditions except that the roof-shaped heater was removed, the residual volatile content was found to be 2 to 4 wt. percent.

EXAMPLE 2

A reaction solution obtained by bulk polymerization of styrene and comprising 5 wt. percent polybutadiene, 15 wt. percent toluene, 4 wt. percent styrene monomer and 76 wt. percent polystyrene was fed at 240°C. to 250°C. under a pressure of 7 to 13 kg/cm$^2$ into the same apparatus as used in Example 1.

The vacuum was kept at 40 to 50 mm.Hg, absolute. The temperature of the above-mentioned heater was kept at 250°C. to 260°C. The temperature of the polymer composition accumulated in the lower part of the vacuum tank was about 230°C. After analysis in the same manner as in Example 1, the residual volatile content was found to be 0.2 to 0.5 wt. percent.

What is claimed is:

1. Process for removing volatile substances including unreacted monomer and solvent from a reaction solution obtained by polymerization of said monomer and containing a substantial portion up to 60 weight percent of said volatile substances in admixture with a viscous relatively non-volatile polymer, which process comprises the steps of:
    A. heating said mixture to a temperature above the boiling points of said volatile substances but below the temperatures at which said non-volatile polymer begins to thermally decompose;
    B. subjecting said mixture to a pressure of from 2 to 20 kg/cm$^2$ and forming a strand in foaming condition to volatilize substantial portions of said volatile substances;
    C. impacting said strand at sub-atmospheric pressure with a first surface to expose and volatilize additional portions of said volatile substances; and
    D. flowing said mixture after impact in the form of a film over a heated elongated and descending substantially vertical second surface under sub-atmospheric pressure to volatilize further amounts of said volatile substances, the residual amount of said volatile substances being a maximum of about 0.5 weight percent of said mixture.

2. Process as claimed in claim 1 wherein said polymer is polystyrene and said monomer is styrene.

3. Process as claimed in claim 2 wherein the temperature of said mixture in steps (A), (B), (C), and (D) is the range of about 150°C. to about 300°C.

4. Process as claimed in claim 3 wherein the subatmospheric pressure in said steps is in the range of about 50 to about 100 mm./Hg, absolute.

5. Process as claimed in claim 1 wherein said strand in foaming condition is formed by discharging said mixture under said pressure through an orifice.

6. Process as claimed in claim 5 wherein said orifice is circular having a diameter of 1 to 4 mm.

7. Process as claimed in claim 6 wherein a plurality of orifices is provided.

* * * * *